(12) United States Patent
Stadler et al.

(10) Patent No.: US 10,146,867 B2
(45) Date of Patent: Dec. 4, 2018

(54) METHODS FOR GENERATING A MIX OF MUSIC TRACKS

(71) Applicant: 100 Milligrams Holding AB, Stockholm (SE)

(72) Inventors: Svante Stadler, Stockholm (SE); Jonas Norberg, Stockholm (SE)

(73) Assignee: 100 Milligrams Holding AB, Stockholm (SE)

( * ) Notice: Subject to any disclaimer, the term of this patent is extended or adjusted under 35 U.S.C. 154(b) by 417 days.

(21) Appl. No.: 14/974,556

(22) Filed: Dec. 18, 2015

(65) Prior Publication Data

US 2016/0179946 A1    Jun. 23, 2016

(30) Foreign Application Priority Data

Dec. 18, 2014   (SE) .................................... 14515837

(51) Int. Cl.
*G06F 17/30* (2006.01)
*G10H 1/00* (2006.01)
*G11B 27/038* (2006.01)

(52) U.S. Cl.
CPC .. *G06F 17/30746* (2013.01); *G06F 17/30752* (2013.01); *G06F 17/30772* (2013.01); *G10H 1/0025* (2013.01); *G10H 1/0033* (2013.01); *G11B 27/038* (2013.01); *G10H 2210/031* (2013.01); *G10H 2210/125* (2013.01)

(58) Field of Classification Search
CPC .............. G06F 17/30; G06F 17/30746; G06F 17/30752; G06F 17/30772; G10H 1/00; G10H 1/0025; G10H 1/0033; G10H 2210/031; G10H 2210/125; G11B 27/038
USPC ............................. 700/94; 717/726, 999.07
See application file for complete search history.

(56) References Cited

U.S. PATENT DOCUMENTS

| | | | |
|---|---|---|---|
| 9,343,054 B1* | 5/2016 | McGilliard | G06F 17/30772 |
| 2008/0189330 A1* | 8/2008 | Hoos | G06F 17/30743 |
| 2013/0167029 A1* | 6/2013 | Friesen | G06F 3/0482 |
| | | | 715/716 |

* cited by examiner

*Primary Examiner* — Melur Ramakrishnaiah
(74) *Attorney, Agent, or Firm* — Rothwell, Figg, Ernst & Manback, P.C.

(57) ABSTRACT

Methods and computer readable medium encoded with computer instructions are disclosed for automatically evaluating music tracks to determine which tracks will be suitable for mixing together, by determining a cost of mixing a current track and each of a number of potential next tracks and comparing the costs. Further, methods and computer readable medium encode with computer instructions are disclosed for automatically optimizing the mix of two music tracks by determining the cost of each of a number of possible mixes and selecting the mix associated with the lowest cost.

17 Claims, 1 Drawing Sheet

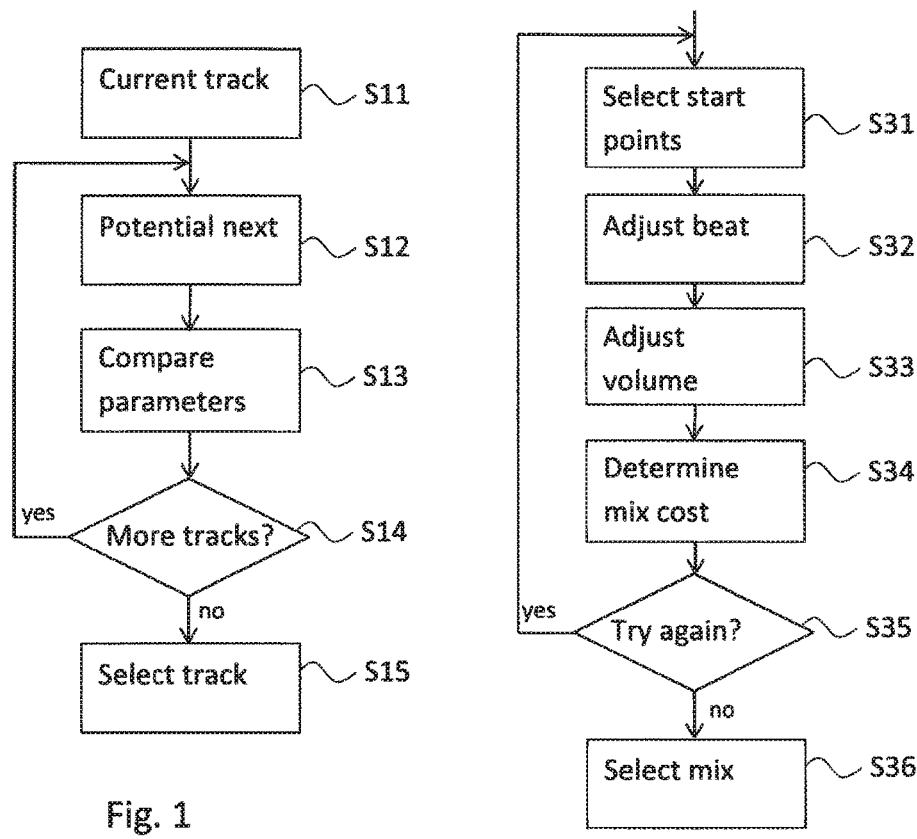
Fig. 1
Fig. 3
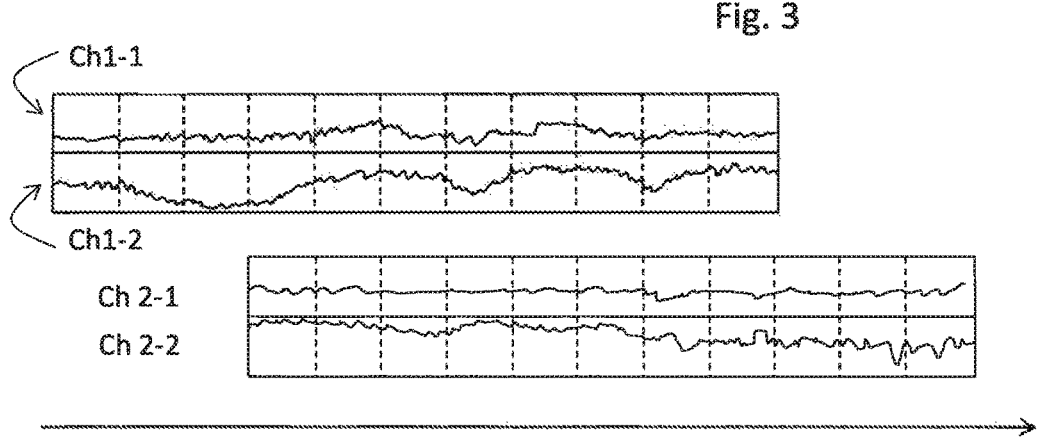
Fig. 2

METHODS FOR GENERATING A MIX OF MUSIC TRACKS

CROSS-REFERENCE TO RELATED APPLICATIONS

The present application claims priority benefit under 35 U.S.C. § 119(a) of Swedish Application No. 14515837, entitled "Computer Program, Apparatus and Method for Generating a Mix of Music Tracks," filed Dec. 18, 2014, the contents of which are incorporated herein by reference in their entirety.

TECHNICAL FIELD

The present invention relates to the automatic mixing of music tracks to produce a music mix such as might be generated by a disc jockey ("DJ").

BACKGROUND

It is well known to mix music tracks together manually, and for DJs to create mixes using music tracks stored on computers or retrieved from the Internet. In the last few years, mixing technologies have been developed to handle streamed music files. For example the App Pacemaker® has been integrated with the music streaming service Spotify®.

Properties characterizing a good music mix include primarily that the mix produces a continuous stream of music where the beat and the energy of the output are perceived as close to a continuous flow as possible. There should be a rhythm, or a pulse, that is perceived as steady and without disruptions. Any changes should be gradual, and the intensity and the dynamic should also be perceived as a continuous flow.

Creating a good mix requires knowledge of the music tracks available, and practice in handling the controls of the DJ equipment used. However, even people who lack this knowledge and experience might want to create mixes to suit their musical preferences. This involves both selecting good music tracks to mix, mixing them together and applying effects to the music tracks while they are being played back. For example, when a DJ mixes two music tracks, the playback speed of one or both music tracks may be adjusted at least for a period of time, so that the beats of the two music tracks will be in sync during the transition from the current music track to the next.

GB2370405 discloses a semi-automatic method of mixing music tracks. Two selected music tracks may be mixed together. In order to enable the mixing of music tracks, each music track that is made available is analysed and annotated manually. For each music track, crossfade sections comprising a first section at the beginning and a second section at the end of the track is specified. The first section is the part of the music track that should be mixed together with the music track immediately preceding it in the mix. The second section is the part of the music track that should be mixed together with the music track immediately succeeding it in the mix, that is, with a first section of the succeeding music track. GB2370405 only describes mixing in terms of crossfading selected music tracks in and out, and only in dependence of crossfade sections that must be specified manually in advance.

US Patent publication No. 2008/0249644 A1 discloses a method for automatic mixing of music tracks. The method is based on determining a property such as the timbre of each music track and then select two music tracks that are as similar as possible, to be mixed together. This does not always yield a satisfactory result for the listener.

There are other DJ programs, such as DJAY, that will mix files by automatically crossfading but without performing any analysis or adaptation of the files. This means that mix parameters, such as the amount of overlap between music tracks, must be set manually by the user.

SUMMARY

The invention relates to the automated mixing of music tracks. Ideally the perceived quality should be as if the mix were generated manually by a skilled DJ. Preferably, this involves both the selection of music tracks that will mix well together and the actual mixing of the music tracks.

One aspect of the invention concerns a first method of selecting a music track file from a set of music track files, each comprising at least a music track, to be played as a next music track file after a current music track comprised in a current music track file in a music mix, each of the music tracks being associated with at least a first parameter indicative of an acoustic property of the music track, said at least first parameter reflecting the time-frequency distribution of acoustic energy of the potential next music track file, said method being performed in a computer and including the steps of a) selecting a potential next music track file comprising a potential next music track, from the set of music track files; b) comparing the at least first parameter of the potential next music track with the at least first parameter of the current music track; c) associating the result of the comparison with a track cost, said track cost being arranged to reflect inversely the suitability of the potential next music track for being mixed with the current music track, said cost taking into account the total level of said first parameter in a resulting mix of the current and the next music track; and selecting the next music track file to be played based on said cost.

This enables the evaluation of one or more potential next music tracks to see how suitable they are for being mixed with the current music track to follow the current track in the mix. The term music track in this document is not necessarily limited to files having only music tracks in them. It also encompasses files such as music videos having a music track and other information such as video images. Files comprising at least a music track and possibly other types of information will be referred to in this document as music track files.

This first method preferably further comprises repeating steps a)-c) above for a number of potential next music tracks comprised in music track files, and selecting a potential next music track based on the costs for a number of music tracks. The method enables the selection of a music track among a set of music tracks that will have the greatest possibility of being mixed with the current music track to provide a resulting mix that is perceived as good by a listener. The selection may be made automatically, by selecting the potential next music track associated with the lowest mix cost. Alternatively, a number of suitable alternatives may be presented to the user, to enable the user to choose between them.

Advantageously, the first parameter for a particular music track is associated with a number of first parameter values indicative of the parameter at different points in time when the music track is being played and the parameter values for at least a first and a second point in time in each music track are compared.

The at least first parameter typically comprises at least one of the following:
- tempo (beats per minute),
- musical key,
- rhythmic complexity,
- dynamic properties, and
- style or genre.

Another aspect of the invention concerns a second method of mixing a current music track file comprising a current music track with a next music track file comprising a next music track, the method comprising optimizing mixing based on the properties of the current music track and the next music track, said optimization being performed in a computer and including the steps of a) determining at least a first and a second point in time in the current music track; b) determining a first mix cost associated with starting a transition from the current music track to the next music track at the first point in time; c) determining a second mix cost associated with starting a transition from the current music track to the next music track at a second point in time; and selecting a music track mix based on the determined second mix cost. The c) step may be repeated as desired to determine a number of mix costs that may be compared.

One of the first or second points in time may be selected as the first start point for starting the transition, in dependence of the mix cost associated with each of the points in time. The selection may be made by a program or a number of different mixes may be presented to a user, to let the user select one of them.

In a preferred embodiment, this second method further comprises determining at least a first parameter related to the mix, said parameter being at least one of
- the beats per minute of the current music track and the next music track,
- the number of bars in a phrase in each of the current music track and the next music track, and
- the amplitude, or volume of at least a portion of each of the current and next music tracks, at a number of points in time.

This ensures that after a next music track has been selected, it can be mixed in the best possible way with the current music track.

The second method may further comprise manipulating a property of the current or the next music track to improve the mix, such as the amplitude of the whole music track, or if applicable one of the frequency bands or channels of the music track, and determining a third mix cost including the effect of the manipulation. In this way, the quality of the mix of the current music track and the next music track can be further improved by adapting the properties of the two music track being mixed to maximize the smoothness of the transition.

Advantageously the second method further comprises determining a second start point in the second music track where the transition should start, the second start point arranged to be aligned with the first start point when playing the mix. This enables the mix to start at any suitable point within the second music track, not necessarily at the start. It also enables the length of the transition between the current and the next music track to be set dynamically. This means that the crossfade, or transition time between any two music tracks may be set as appropriate based on the actual music tracks.

The first and second method may be combined in such a way that the mixing according to the second method is used to mix a first music track with a second music track that has been selected on the basis of the first method.

This combined method preferably comprises the following steps: providing a current music track file comprising a current music track, selecting a next music track file comprising a next music track based on a comparison between at least two potential next music track files and the current music track file, evaluating at least two possible mixes between the current music track file and the next music track file, and selecting one of the possible mixes as an output mix for playback. The selection may be made by a program or a number of different mixes may be presented to a user by the computer, to let the user select one of them.

The first, second and combined methods are implemented in computer programs, for example, as application programs, or apps. The methods may be implemented in separate programs, or together in one program.

Each music track file comprises at least one music track. In some cases it may also comprise other types of information. For example, it may be a music video which provides a stream of images with the music. In such a case, the music tracks may be mixed according to the above. The transition between the video stream of the current and the next file may be handled in a number of different ways. In a simple case, the next video stream will simply replace the current at a suitable point in time. Another simple solution would be a standard crossfade between the two video streams, but more advanced effects may also be applied, such as flickering between the two rapidly so they look like one.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 1 is a flow chart of an embodiment of the method of selecting a music track for the mix.

FIG. 2 illustrates the overlap of a first and a second music track.

FIG. 3 is a flow chart of an embodiment of the method of selecting a specific mix.

DETAILED DESCRIPTION

The mixing comprises two parts: the selection of suitable music tracks, as discussed in connection with FIG. 1, and the actual mixing of the tracks, as discussed in connection with FIG. 3. As will be understood, the methods according to FIGS. 1 and 3 are typically implemented as computer programs arranged to be run in a processor, typically, but not necessarily, a processor of a music playing device. The programs may also be stored on any suitable type of carrier or medium. The programs may be implemented as one or more separate programs, or as a combined program having functions both for evaluating suitable tracks to mix and for mixing them.

Computer readable program code may be stored in a transitory or non-transitory computer readable medium encoded with computer-executable instructions, such as, but not limited, to magnetic media (e.g., a hard disk), non-transitory memory, optical media (e.g., a DVD), memory devices (e.g., random access memory), and the like. In some embodiments, computer readable program code is configured such that, when executed by a processor, the code, or instructions, causes exemplary computers to perform steps described herein for the selecting, mixing, and obtaining a mix of music tracks and files. In other embodiments, the exemplary computers are configured to perform the described steps without the need for code. Therefore, the features of the present embodiments described herein may be implemented in any suitable combination of hardware and/or software.

The first part of the mixing according to the invention is the selection of music tracks that are suitable for being mixed together. According to this aspect of the invention the starting point, in step S11, is a current music track that should be played first in the mix. Based on this current music track, in step S12, a potential next music track is selected. Since this next music track is to be played just after the current music track, a music track that is a good match with the current music track should be selected. There may also be other criteria, as will be discussed below. It should be understood that the music tracks are comprised in music track files, which may also comprise other types of information, such as a video stream.

According to the invention, therefore, the method involves comparing the properties of a number of available music tracks with the properties of the current music track. So, in Step S13, the properties of the potential next music track are evaluated, in terms of how well they match the properties of the current music track, as will be discussed below. As a result a track cost value is determined, and stored to be compared to track cost values for other potential next music tracks. The track cost value will be discussed below. Step S13 may be include the actual determination of the acoustic properties of each track, but preferably the acoustic properties are determined beforehand for all tracks so that step S13 only involves assessing the how well the properties of the current and the next track complement each other.

Step S14 is a decision step for determining whether another potential next music track should be evaluated. If so, the procedure returns to step S12 for selection of a new music track which becomes the potential next music track. If not, the procedure continues with step S15 in which one of the potential next music tracks that have been evaluated, is selected. The criteria for selecting one of the potential next music tracks will be discussed below.

The parameters to be evaluated in step S13 are related to the acoustic properties of the music tracks, including:
  tempo (measured as beats per minute),
  musical key (such as A minor),
  rhythmic complexity,
  dynamic properties, and
  style or genre.

Beats per minute is the simplest parameter to define, as it is simply a number representing the number of beats per minute. Each musical key may be represented by a number in such a way that keys that go well together will generate a low cost when comparing the keys of the current music track and the potential next music track. Rhythmic complexity is a measure of the irregularity of transients in the signal. It is computed as the amount of deviation from the most basic pattern—a steady periodic pulse train. Dynamic properties include the perceived loudness, the crest factor and the distribution of acoustic energy across the audible frequency spectrum. Musical style or genre is difficult to define, but can be estimated numerically by analysing co-occurrence in playlists, buying patterns and descriptive texts found, for example on the Internet. This type of analysis is well established and is offered as a service by companies such as Echo Nest and GraceNote. Preferably, each of these properties includes a number of parameters. For example, the rhythmic complexity may be quantified on a scale, where 1 indicates a low complexity and 10 indicates high complexity.

Preferably, each music track that is available is analysed beforehand so that at the time of mixing there is a database of parameters for the respective properties of all potential next music tracks available. Alternatively, it would be possible to analyse a music track as needed, which would, however, require more computation power because more analyses would have to be performed in a short time frame. Preferably, the music tracks are analysed in a background process while the program according to the invention is running.

In step S14, the decision to evaluate another potential next music track, or to proceed to select one of the music tracks already evaluated, may be based on different criteria. For example, the selection may be made when a certain number of music tracks have been tested, or when all music tracks of a particular style or genre have been tested, or when all music tracks having a beat per minute within a certain range compared to the current music track have been tested. For each music track that is tested, a cost is determined based on a number of parameters, as will be explained below. This cost will be referred to as the track cost, and the music track that has the lowest track cost among the music tracks that have been tested will be selected. Alternatively, a threshold cost may be defined and the procedure may be stopped when a potential next music track is found that is associated with a track cost within the threshold cost. This music track will then be selected as the next music track.

It may be possible to specify a direction for the gradual change of one or more parameters. For example, there may be a desire to gradually increase or decrease the beats per minute over a number of music tracks to be played, possibly associated with one or more other parameters, for example the energy or dynamic properties of the music track. In this way, the beat and/or energy of a mix can be made to build up over time, or to decrease, for example, towards the end of a party. Otherwise, the parameters will typically vary up and down over time.

In step S15, the next music track to be played after the current music track is selected. This may be done automatically by the program selecting the music track generating the lowest cost. Alternatively, a number of suitable music tracks may be presented for the user to choose between.

The mixing may be further optimized based on the properties of the current music track and the next music track. This involves optimizing a number of parameters related to the mix, including
  matching of one or more points in time between the current music track and the next music track in such a way that musical phrases align and/or that the musical components of the music tracks complement each other,
  the amplitude, or volume of each song at a number of points in time, and
  the settings of effect parameters.

The points in time of each music track are preferably synchronous with the beats, so that for the case of a beat-matched mix, the points in time for the two music tracks may be aligned.

The optimal way to mix the current music track and the next music track together is determined by determining the cost of a number of different possible mixes. The cost associated with a particular possible mix will be referred to as the mix cost, and is a scalar sum of values relating to the parameters mentioned above, which will be representative of the level of disturbing elements in the mix. This means that the mix cost is to be kept as low as possible, to create a mix that will be perceived by listeners as good. Although mix quality is inherently subjective, certain qualities appear universal, such as minimal dissonance between adjacent music tracks, maximum continuity of rhythm and tempo, avoidance of gaps or near-gaps between adjacent music tracks.

In order to minimize the mix cost, a number of possibilities are evaluated. For example, different points in time with respect to the current music track, at which time to start the playback of the next music track to vary the overlap between the current music track and the next music track. Also, the point in the next music track where the playback should start may be varied. The points in time will normally be selected as a position within the respective music track rather than actual points in time. For each such possibility, the mix cost is evaluated and the possibility associated with the lowest mix cost is retained as the optimal choice.

For example, the point in the next music track where playback of this music track should start may be selected, and different scenarios may be tested in which the next music track starts at different points in the current music track and then the music tracks are mixed together. This means that different periods of overlap between the current music track and the next music track should be tested, for example:

the last bar of the current music track and the first bar of the next music track,
the two last bars of the current music track and the two first bars of the next music track, and so on, and
up to the x last bars of the current music track and the y first bars of the next music track, x and y being integers, and usually the same integer.

There is also the possibility of truncating the end of the first music track and/or the beginning of the second music track by a suitable number of bars. Such possibilities are also evaluated.

For each music track a certain amount of metadata should be made available, said metadata being indicative of the acoustic properties of each bar throughout the music track. It would be possible, but complex, to compare the waveforms of the two music tracks to determine the best possible overlap. A more practical solution is to compare metadata related to such parameters as dynamics and energy of the respective bars of the music tracks that are to be mixed together.

For each possible mix to be evaluated, the cost of the mix should be determined. As with the track cost, the mix cost is a scalar value indicative of the level of disturbance or disruption experienced when playing the mix. There are different factors that will affect the mix cost, as will be discussed in the following.

A piece of music is often comprised of a number of phrases, each having a certain number of bars, for example two, four, eight, twelve or even sixteen bars. In these cases it will be preferable to mix the songs together so that a phrase of the next music track starts at the beginning of a phrase in the current music track. If the phrases do not match in a possible mix, the mix cost for this particular possible mix will increase.

The mix cost is also affected by other parameter settings, such as the energy, or volume for each music track. The volume may also be matched for each frequency range or for each channel within the music tracks, if applicable, and any effects that are applied. For example, if the bass amplitude is very high in both music tracks, the total bass in the resulting mix will be too loud, which will result in a higher cost. One solution to this would be to attempt a different overlap between the two music tracks, that is, let them overlap for a longer or shorter amount of time. Another solution would be to reduce the bass level for one or both music tracks in such a way that the end result will be appropriate. Of course, the same kind of adjustment may be made for any other frequency range. Similarly, other effects such as reverb may be applied to modify the acoustic properties.

Some parameters will favour a short overlap, or no overlap. For example, the total cost caused by mismatches between the music tracks will be reduced if the overlap between the music tracks is short. On the other hand, other parameters will favour a longer overlap. Typically, a mix is perceived as good if any variations in beat, sound, energy etc. are non-disruptive. This favours a longer overlap which will increase the sense of continuity. Simply playing two music tracks after each other will be associated with a low cost in caused by overlap mismatches, but will have a higher cost for a disruptive transition from one music track to the next.

The factors affecting the cost may be weighted to assign different importance to them, for example to balance out the influence of factors that favour a long overlap and that of factors that favour a short overlap. For a high quality system these weights must be tweaked by an experienced DJ.

FIG. 2 illustrates a possible overlap between a first music track comprising a first 1-1 and a second 1-2 channel and a second music track comprising a first 2-1 and a second 2-2 channel. It should be understood that a track may also comprise only one channel. In some cases there may be more channels in each music track, but for clarity reasons only two channels per music track are shown. Also, only a few bars of each music track, near the overlap, are shown, that is, near the end of the first music track and the beginning of the second music track. The direction of time is indicated by an arrow labelled t. Irregular lines indicate the volume, or energy level, over time for each channel within the respective music track. As can be seen, the first channel, 1-1 and 2-1, of each music track is showing relatively small variations around a medium energy level. The second channel 1-2 of the first music track starts at a relatively low level in the first bars shown but ends at a higher level. The second channel 2-2 of the second music track also starts at a lower level but ends at higher level.

This means that the mix shown in FIG. 2 will have a high total level of the type of content on the second channels. One way of resolving this would be to delay the start of the second music track so that the period with a lower level on channel 2-2 of the second music track would overlap with the period with a higher level on channel 1-2 of the first music track. This may, however, affect other parameters negatively. For example, it may cause a mismatch between the start of phrases in the two music tracks, which should be coordinated. Another option would be to reduce the volume of the second channel in one or both of the music tracks.

The following pseudo-code is an example of a possible implementation of the program according to the invention. The music tracks are referred to simply as tracks in this example.

For the method outlined in FIG. 1, the determination of the acoustic properties of the respective tracks may be carried out according to the following:

1. For each track_n, n~[1,numTracks]:
   analyze the musical structure, estimating:
      the onset time of each musical beat, bar and phrase
      tonal properties such as musical key (e.g. A minor)
      time-frequency distribution of acoustic energy (spectrum, temporal dynamics)
      rhythmic complexity
   for each musical time unit (e.g. bar/measure):
      record above acoustic properties for this section only
   After analysis, each track_n has a corresponding data file analysis_n, which contains:
   tempo (bpm)
   musical key
   rhythmic/dynamic/spectral properties encoded as real numbers
   numBars (the number of estimated musical bars in track_n)
   barArray_i, i~[1,numBars]
These data files may be considered for different combinations of the current and the next track to determine the cost of mixing the two tracks The method outlined in FIG. 3 can for example be implemented by means of the following pseudocode:
2. For a given pair of tracks, track_1 and track_2:
   For each possible number of bars overlapped, o~[0, maxNumOverlapBars]:
      compute mixCost=discontinuityCost+overlapCost
         discontinuityCost: the total deviation from a smoothed spectro-temporal trajectory from the middle of track1 to the middle of track2
         overlapCost: an estimate of the amount of "clashing" between the two tracks, e.g. both tracks having vocals, or the sum of signals results in non-harmonious and/or non-rhythmic components
      select the overlap that minimized mixCost
      find the effect parameter trajectories for the given optimal overlap that minimize mixCost, using Dynamic Programming FIG. 3 illustrates a possible procedure for evaluating the possible mixes between the current music track and the next music track. The next music track has preferably been selected in accordance with the method discussed with respect to FIG. 1, but may also be selected manually or in any other way. In step S31, a starting point for the current music track and a starting point for the next music track, indicating where the mix of the two music tracks should start, is selected. In step S32, it is determined whether the beat of any of the music tracks needs to be adjusted for the beats to match and any such adjustments are made. In step S33, it is determined if any other adjustments should be made to improve the mix. This may involve, for example, detecting that both music tracks have a high volume at a particular time and adjust the volume of one or both music tracks to get a suitable total level.

In step S34, the mix cost for the particular mix is generated and stored. Step S35 is a decision step for determining if another possible mix should be generated. If yes, the procedure returns to step S31, if no, one of the possible mixes already evaluated is selected for playback. The selection may be performed by the program implementing the method. In this case, the mix associated with the lowest mix cost of the possible mixes that have been evaluated will be selected at S36. It is also possible to have the program present a number of possible results to a user, for manual selection of one of the possible mixes. The n best mixes may be presented, n being an integer, for example 10. This may also be implemented by displaying wave forms of the current and the next music track in such a way that the next music track can be dragged and dropped by the user. Preferably in this case the program is implemented in such a way that the wave form being moved will snap to the nearest suitable position in the current music track for creating a good mix. Further adjustments may of course be made to the music tracks, manually or by means of the program, after a mix has been selected, if desired.

As mentioned above, each music track may be associated with other types of information in a music track file. This information may be handled in any suitable way when mixing the tracks. In the case of a music video, the stream of images must be handled in some way. A simple solution would be to switch from the current video stream to the next video stream at a suitable point in time, typically during the crossfade, or transition from the current music track to the next. Another simple solution would be to apply a standard crossfade between the two video streams, but more advanced effects may also be applied, such as flickering between the two rapidly so they look like one.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and methods described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A computer-implemented method of selecting a music track file from a set of music track files, each comprising at least a music track, to be played as a next music track file after a current music track comprised in a current music track file in a music mix, each of the music tracks being associated with at least a first parameter indicative of an acoustic property of the music track, said at least first parameter reflecting the time-frequency distribution of acoustic energy of the potential next music track file, said method comprising the following steps:
   a) selecting a potential next music track file from the set of music track files, said potential next music track file comprising a potential next music track;
   b) comparing the at least first parameter of the potential next music track with the at least first parameter of the current music track;
   c) associating the result of the comparison with a cost, said cost being arranged to reflect inversely the suitability of the potential next music track file for being mixed with the current music track file, said cost taking into account the total level of said first parameter in a resulting mix of the current and the next music track; and
   d) selecting the next music track file to be played based on said cost;
   wherein the first parameter for a particular music track is associated with a number of first parameter values indicative of the parameter at different points in time when the music track is being played and the parameter values for at least a first and a second point in time in each music track are compared.

2. The method according to claim 1, further comprising repeating steps a)-c) for a number of potential next music tracks to generate a number of cost values, each corresponding to one of the potential next music tracks, and selecting a potential next music track file based on a comparison of the cost values.

3. The method according to claim 1, wherein the at least first parameter is at least one of the following:
tempo, represented as beats per minute;
musical key;
rhythmic complexity;
dynamic properties; and
style or genre.

4. A non-transitory computer-readable medium encoded with computer-executable instructions which when run in a processor will cause the processor to perform the method according claim 1.

5. A computer-implemented method of mixing a current music track file comprising a current music track with a next music track file comprising a next music track, the method comprising:
a) determining at least a first and a second point in time in the current music track;
b) determining a first mix cost associated with starting a transition from the current music track to the next music track at the first point in time, said first mix cost being based on at least a first parameter reflecting the time-frequency distribution of acoustic energy of the potential next music track file, said cost taking into account the total level of said first parameter in a resulting mix of the current and the next music track;
c) determining a further mix cost associated with starting a transition from the current music track to the next music track at a further point in time different from the first point in time, said further mix cost being based on at least the first parameter, said cost taking into account said acoustic property in a resulting mix of the current and the next music track;
d) repeating step c) a number of times as desired; and
e) selecting a music track mix based on the determined further mix cost.

6. The method according to claim 5, further comprising the step of selecting one of the first or further points in time as the first start point for starting the transition, regardless of the mix cost associated with each of the points in time.

7. The method according to claim 5, further comprising determining at least a first parameter related to the mix, said parameter being at least one of:
the beats per minute of the current music track and the next music track;
the number of bars in a phrase in each of the current music track and the next music track; and
the amplitude, or volume of at least a portion of each of the current and next music tracks, at a number of points in time.

8. The method according to claim 5, further comprising manipulating a property of the current or the next music track to improve the mix, such as the playback volume of the music track; and determining a third mix cost including the effect of the manipulation.

9. The method according to claim 5, further comprising determining a second start point in the second music track file where the transition should start, the second start point arranged to be aligned with the first start point when playing the mix.

10. A non-transitory computer-readable medium encoded with computer-executable instructions which when run in a processor will cause the processor to perform the method according claim 5.

11. A computer-implemented method of mixing a current music track file comprising a current music track with a next music track file comprising a next music track, the method comprising:
a) determining at least a first and a second point in time in the current music track;
b) determining a first mix cost associated with starting a transition from the current music track to the next music track at the first point in time, said first mix cost being based on at least a first parameter reflecting the time-frequency distribution of acoustic energy of the potential next music track file, said cost taking into account the total level of said first parameter in a resulting mix of the current and the next music track;
c) determining a further mix cost associated with starting a transition from the current music track to the next music track at a further point in time different from the first point in time, said further mix cost being based on at least the first parameter, and said cost taking into account said acoustic property in a resulting mix of the current and the next music track;
d) repeating step c) a number of times as desired;
wherein the next music track is selected from a set of music track files, each said music track file comprising at least a music track associated with at least a first parameter indicative of an acoustic property of the music track, said at least first parameter reflecting the time-frequency distribution of acoustic energy of the potential next music track file,
e) selecting a potential next music track file from the set of music track files, said potential next music track file comprising a potential next music track;
f) comparing the at least first parameter of the potential next music track with the at least first parameter of the current music track;
g) associating the result of the comparison with a cost, said cost being arranged to reflect inversely the suitability of the potential next music track file for being mixed with the current music track file, said cost taking into account the total level of said first parameter in a resulting mix of the current and the next music track; and
h) selecting the next music track file to be played based on said cost.

12. The method according to claim 11, wherein step e) is performed automatically by selecting the point in time among the first and the further points in time being associated with the lowest mix cost.

13. The method according to claim 11, wherein step e) comprises presenting a number of possible mixes based on the first and the further points in time to a user and enabling the user to select one of the possible mixes.

14. The method according to claim 13, wherein the user is enabled to select one of the possible mixes by drag and drop of a representation of the second music track onto a representation of the first music track.

15. A non-transitory computer-readable medium encoded with computer-executable instructions which when run in a processor will cause the processor to perform the method according claim 11.

16. A computer-implemented method of obtaining a mix of a first and a second music track file, comprising the following steps: providing a current music track file, selecting a next music track file to be played as a next music track after the current music track based on a comparison between at least two potential next music track files and the current music track, each of the music tracks being associated with at least a first parameter indicative of an acoustic property of the music track, said at least first parameter reflecting the time-frequency distribution of acoustic energy of the potential next music track file, said method further comprising the following steps:

a) selecting a potential next music track file from the set of music track files, said potential next music track file comprising a potential next music track;

b) comparing the at least first parameter of the potential next music track with the at least first parameter of the current music track;

c) associating the result of the comparison with a cost, said cost being arranged to reflect inversely the suitability of the potential next music track file for being mixed with the current music track file, said cost taking into account the total level of said first parameter in a resulting mix of the current and the next music track;

d) evaluating at least two possible mixes between the current music track file and the next music track file, and selecting one of the possible mixes as an output mix for playback, the selection involving the following steps:

e) determining at least a first and a second point in time in the current music track;

f) determining a first mix cost associated with starting a transition from the current music track to the next music track at the first point in time, said first mix cost being based on at least a first parameter reflecting the time-frequency distribution of acoustic energy of the potential next music track file, said cost taking into account the total level of said first parameter in a resulting mix of the current and the next music track;

g) determining a further mix cost associated with starting a transition from the current music track to the next music track at a further point in time different from the first point in time, said further mix cost being based on at least the first parameter, and said cost taking into account said acoustic property in a resulting mix of the current and the next music track;

h) repeating step c) a number of times as desired; and f) selecting a music track mix for playback based on the determined further mix cost.

17. A non-transitory computer-readable medium encoded with computer-executable instructions which when run in a processor will cause the processor to perform the method according claim 16.

\* \* \* \* \*